United States Patent
Yu

(10) Patent No.: US 11,331,788 B2
(45) Date of Patent: May 17, 2022

(54) SMART GRABBING DEVICE AND METHOD FOR CONTROLLING THE SAME AND TERMINAL

(71) Applicant: BOE TECHNOLOGY GROUP CO., LTD., Beijing (CN)

(72) Inventor: Zhanquan Yu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 250 days.

(21) Appl. No.: 16/615,384

(22) PCT Filed: Mar. 19, 2019

(86) PCT No.: PCT/CN2019/078644
§ 371 (c)(1),
(2) Date: Nov. 20, 2019

(87) PCT Pub. No.: WO2019/179416
PCT Pub. Date: Sep. 26, 2019

(65) Prior Publication Data
US 2020/0130170 A1  Apr. 30, 2020

(30) Foreign Application Priority Data

Mar. 19, 2018 (CN) .......................... 201810224235.7

(51) Int. Cl.
*G05B 15/00* (2006.01)
*G05B 19/00* (2006.01)
(Continued)

(52) U.S. Cl.
CPC ............. *B25J 5/007* (2013.01); *B25J 9/0087* (2013.01); *B25J 9/041* (2013.01); *B25J 9/1697* (2013.01);
(Continued)

(58) Field of Classification Search
CPC ... F16M 1/04; F05D 2220/40; F05D 2250/14; F05D 2250/141; F05D 2260/31;
(Continued)

(56) References Cited

U.S. PATENT DOCUMENTS 5,738,481 A * 4/1998 Rogers .................... B25J 5/007
414/744.6
6,176,779 B1 * 1/2001 Riesterer .............. A01D 46/084
460/119
(Continued)

FOREIGN PATENT DOCUMENTS

CN          203197911 U     9/2013
CN          203552302 U     4/2014
(Continued)

OTHER PUBLICATIONS

Office Action dated Jul. 31, 2020 in CN Application No. 201810224235.7 (27 pages).
(Continued)

*Primary Examiner* — Harry Y Oh
(74) *Attorney, Agent, or Firm* — Muncy, Geissler, Olds & Lowe, P.C.

(57) ABSTRACT

The present disclosure provides a smart grabbing device including: a controller, a container configured to accommodate articles, a grabber configured to grab the articles, and a movable mover. The mover is at a bottom of the container; the grabber is on the container; and both of the grabber and the mover are electrically coupled with the controller. The controller is configured to, control the mover to drive the smart grabbing device to move to a target position, and control the grabber to grab a target article and place the target article in the container.

20 Claims, 4 Drawing Sheets

(51) Int. Cl.
  *B25J 5/00* (2006.01)
  *B25J 9/00* (2006.01)
  *B25J 9/04* (2006.01)
  *B25J 9/16* (2006.01)
  *B25J 13/00* (2006.01)
  *B25J 18/02* (2006.01)
  *B25J 19/02* (2006.01)

(52) U.S. Cl.
  CPC ............ *B25J 13/00* (2013.01); *B25J 18/025* (2013.01); *B25J 19/02* (2013.01); *B25J 19/023* (2013.01)

(58) Field of Classification Search
  CPC .. F05B 2220/40; F05B 2240/14; F04D 17/10; F04D 25/024; F04D 29/4206; F04D 29/624; F04D 29/644; F04D 29/40; F04D 29/403; F01D 25/243; B25J 13/00; B25J 18/025; B25J 19/02; B25J 19/023; B25J 5/007; B25J 9/0084; B25J 9/0087; B25J 9/041; B25J 9/1612; B25J 9/1697
  See application file for complete search history.

(56) References Cited

U.S. PATENT DOCUMENTS

| | | | | |
|---|---|---|---|---|
| 6,408,224 | B1* | 6/2002 | Okamoto | B25J 9/1661 29/721 |
| 9,120,622 | B1* | 9/2015 | Elazary | B25J 15/0608 |
| 9,632,504 | B1* | 4/2017 | Watts | G05D 1/0231 |
| 9,717,387 | B1* | 8/2017 | Szatmary | A47L 9/009 |
| 11,040,447 | B2* | 6/2021 | Zak | G06T 7/0004 |
| 2011/0036898 | A1* | 2/2011 | Lagerkvist | B66C 23/68 228/45 |
| 2011/0174563 | A1* | 7/2011 | Riesner | B25J 5/007 180/117 |
| 2012/0165986 | A1* | 6/2012 | Fuhlbrigge | B25J 9/1687 700/259 |
| 2013/0345875 | A1* | 12/2013 | Brooks | G05B 19/42 700/259 |
| 2015/0343638 | A1* | 12/2015 | Mattern | B25J 21/00 700/245 |
| 2015/0346708 | A1* | 12/2015 | Mattern | B25J 9/0084 700/114 |
| 2015/0352717 | A1* | 12/2015 | Mundt | B25J 9/0096 414/730 |
| 2016/0041557 | A1* | 2/2016 | Trout | G05D 1/0272 701/25 |
| 2016/0114488 | A1 | 4/2016 | Mascorro Medina et al. | |
| 2016/0167227 | A1 | 6/2016 | Wellman et al. | |
| 2016/0176632 | A1* | 6/2016 | Manes | B65G 1/0428 414/277 |
| 2016/0203640 | A1* | 7/2016 | Breedvelt-Schouten | G02B 27/017 345/633 |
| 2017/0329333 | A1* | 11/2017 | Passot | G05D 1/0231 |
| 2018/0111537 | A1* | 4/2018 | Baldys | B60P 1/045 |
| 2018/0158016 | A1* | 6/2018 | Pandya | B65G 1/0492 |
| 2018/0210434 | A1* | 7/2018 | Iwatake | B25J 13/085 |
| 2018/0229988 | A1* | 8/2018 | Gault | B66F 9/24 |
| 2018/0242807 | A1* | 8/2018 | Lee | B25J 9/16 |
| 2021/0073765 | A1* | 3/2021 | Xu | G06Q 20/203 |
| 2021/0129345 | A1* | 5/2021 | Liu | A61B 5/02055 |

FOREIGN PATENT DOCUMENTS

| | | | |
|---|---|---|---|
| CN | 203680293 U | | 7/2014 |
| CN | 104875178 A | | 9/2015 |
| CN | 106003084 A | | 10/2016 |
| CN | 106181985 A | | 12/2016 |
| CN | 106426076 A | | 2/2017 |
| CN | 205915337 U | | 2/2017 |
| CN | 106682418 A | | 5/2017 |
| CN | 106903699 A | | 6/2017 |
| CN | 107000208 A | | 8/2017 |
| CN | 107032031 A | | 8/2017 |
| CN | 107206601 A | | 9/2017 |
| CN | 107283428 A | | 10/2017 |
| CN | 107553465 A | | 1/2018 |
| CN | 110026976 A | * | 1/2018 |
| CN | 108381509 A | | 8/2018 |
| JP | 2007109140 A | * | 10/2005 |
| JP | 2006341957 A | | 12/2006 |
| JP | 2007109140 A | | 4/2007 |
| JP | 2018020423 A | * | 8/2016 |

OTHER PUBLICATIONS

Office Action of CN Application No. 201810224235.7 with English translation, dated Mar. 18, 2020, 28 pages.

International Search Report of PCT/CN2019/078644 with English translation, dated May 22, 2019, 16 pages.

* cited by examiner

SMART GRABBING DEVICE AND METHOD FOR CONTROLLING THE SAME AND TERMINAL

CROSS-REFERENCE TO RELATED APPLICATIONS

This application is the U.S. national phase of PCT Application No. PCT/CN2019/078644 filed on Mar. 19, 2019, which claims the benefit and priority of Chinese Application No. 201810224235.7, filed on Mar. 19, 2018, the disclosures of which are incorporated herein in their entirety by reference.

TECHNICAL FIELD

The present disclosure relates to the technical field of shopping and smart devices, in particular to a smart grabbing device, a method for controlling the same and a terminal.

BACKGROUND

With improvement of people's living standards and continuous development of technology, people often go shopping in the supermarket. However, people's requirements for shopping experience and shopping convenience are higher and higher, and then the online shopping supermarket comes into being so that people can order shopping at home. However, after a customer orders shopping online, it is needed to deliver goods to the customer by delivery staff, which increase labor cost of the online supermarket. Meanwhile, when the customer orders shopping online, the customer cannot intuitively see appearance of the goods, which lowers the customer's shopping experience.

SUMMARY

The present disclosure provides a smart grabbing device including: a controller, a container configured to accommodate articles, a grabber configured to grab the articles, and a movable mover. The mover is at a bottom of the container; the grabber is on the container; and both of the grabber and the mover are electrically coupled with the controller. The controller is configured to, control the mover to drive the smart grabbing device to move to a target position, and control the grabber to grab a target article and place the target article in the container.

Further, the grabber includes at least one telescopic assembly; the telescopic assembly includes an end arranged on the container and another end provided with a grabbing assembly; the another end of the telescopic assembly, which is provided with the grabbing assembly, is extended and retracted, with the end of the telescopic assembly, which is arranged on the container, being taken as a fulcrum.

Further, the grabber further includes a rotating assembly; and the telescopic assembly is connected with the container through the rotating assembly.

Further, the grabber further includes a lifting assembly; a bottom end of the lifting assembly is connected with the rotating assembly; and the end of the telescopic assembly distal to the grabbing assembly is disposed on the lifting assembly.

Further, a first slide rail is provided on the lifting assembly and extends along an axial direction of the lifting assembly; and a first slide block is disposed on the end of the telescopic assembly distal to the grabbing assembly and is in a slidable engagement with the first slide rail.

Further, the telescopic assembly includes at least two telescopic arms; one of two adjacent telescopic arms is provided with a second slide rail, and the other one of the two adjacent telescopic arms is provided with a second slide block in a slidable engagement with the second slide rail.

Further, the container includes at least two accommodating chambers corresponding to article categories; and the accommodating chambers are disposed around the grabber.

Further, the smart grabbing device further includes: a measurer which is electrically coupled with the controller and is configured to measure target articles; wherein the measurer is disposed at one end of the telescopic assembly adjacent the grabbing assembly.

Further, the smart grabbing device further includes: a camera which is electrically coupled with the controller; wherein the camera is disposed at a top of the grabber.

Further, the smart grabbing device further includes: at least one of an infrared sensor or an ultrasonic sensor electrically coupled with the controller and configured to obtain obstacle information.

The present disclosure provides a method for controlling a smart grabbing device, which is applied to the above mart grabbing device, the method includes: receiving an execution instruction and parsing execution information contained in the execution instruction; wherein the execution information includes information of a to-be-grabbed article and target position information of a position where the to-be-grabbed article is located; obtaining path information for reaching a target position, and controlling the smart grabbing device to move to the target position according to the path information; and, controlling the grabber to grab the to-be-grabbed article and place the grabbed article in the container.

Further, the smart grabbing device includes a measurer; the measurer is provided with a preset measurement standard; after controlling the grabber to grab the to-be-grabbed article and place the grabbed article in the container, the method further includes: according to the preset measurement standard, measuring the grabbed article to obtain an amount of money of the grabbed article.

Further, after controlling the grabber to grab the to-be-grabbed article and place the grabbed article in the container, the method further includes: summing amounts of money of all grabbed articles in the container to obtain a total amount of money of all grabbed articles in the container.

Further, obtaining path information for reaching a target position, includes: according to a preset map, the information of the to-be-grabbed article and the target position information, planning a moving path of the smart grabbing device; and obtaining the path information for reaching the target position according to the moving path.

Further, the smart grabbing device includes a camera; controlling the grabber to grab the to-be-grabbed article and place the grabbed article in the container, includes: acquiring a first real-time image shot by the camera, and determining the target position information according to the first real-time image; and according to the target position information, controlling the grabber to grab the to-be-grabbed article and place the grabbed article in the container.

Further, controlling the grabber to grab the to-be-grabbed article and place the grabbed article in the container, further includes: acquiring a second real-time image shot by the camera, and determining a current capacity of the container according to the second real-time image; when the current capacity of the container is smaller than a preset capacity threshold, controlling the grabber to grab the to-be-grabbed article and place the grabbed article in the container.

Further, before obtaining path information for reaching a target position, the method includes: receiving a movement instruction of a user and parsing movement information included in the movement instruction; wherein the movement information includes the path information for reaching the target position.

Further, the smart grabbing device includes a camera; controlling the grabber to grab the to-be-grabbed article and place the grabbed article in the container, includes: acquiring a third real-time image shot by the camera, thereby enabling the user to determine an orientation of the to-be-grabbed article according to the third real-time image; and receiving a grabbing instruction sent by the user according to the orientation of the to-be-grabbed article, and controlling the grabber to grab the to-be-grabbed article and place the grabbed article in the container.

The present disclosure provides a computer readable storage medium including a computer program stored thereon; wherein the computer program is executed to implement the above method.

The present disclosure provides a terminal for a smart grabbing device including: a processor and a memory; wherein the memory stores a computer program thereon; when the computer program is executed, the above method is implemented.

BRIEF DESCRIPTION OF THE DRAWINGS

The above and/or additional aspects and advantages of the present disclosure will become apparent and easy to understand from the following description of embodiments in conjunction with the accompanying drawings, in which.

DETAILED DESCRIPTION

Detailed description of the exemplary embodiments will be made herein, with examples thereof to be shown in drawings. In the following descriptions, when the drawings are referred to, unless expressed otherwise, the same number in different drawings refers to the same or similar elements. The embodiments are intended to be exemplary only, and are not intended to limit the scope of the inventive concept in any way.

It will be understood by those skilled in the art that, as used herein, the singular forms "a", "an", and "the" are intended to include the plural forms as well, unless expressly stated otherwise. It should be further understood that the terms "comprises" and/or "comprising" when used in this specification is taken to specify the presence of stated features, integers, steps, operations, elements, and/or components, but does not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will be understood by those skilled in the art that, unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
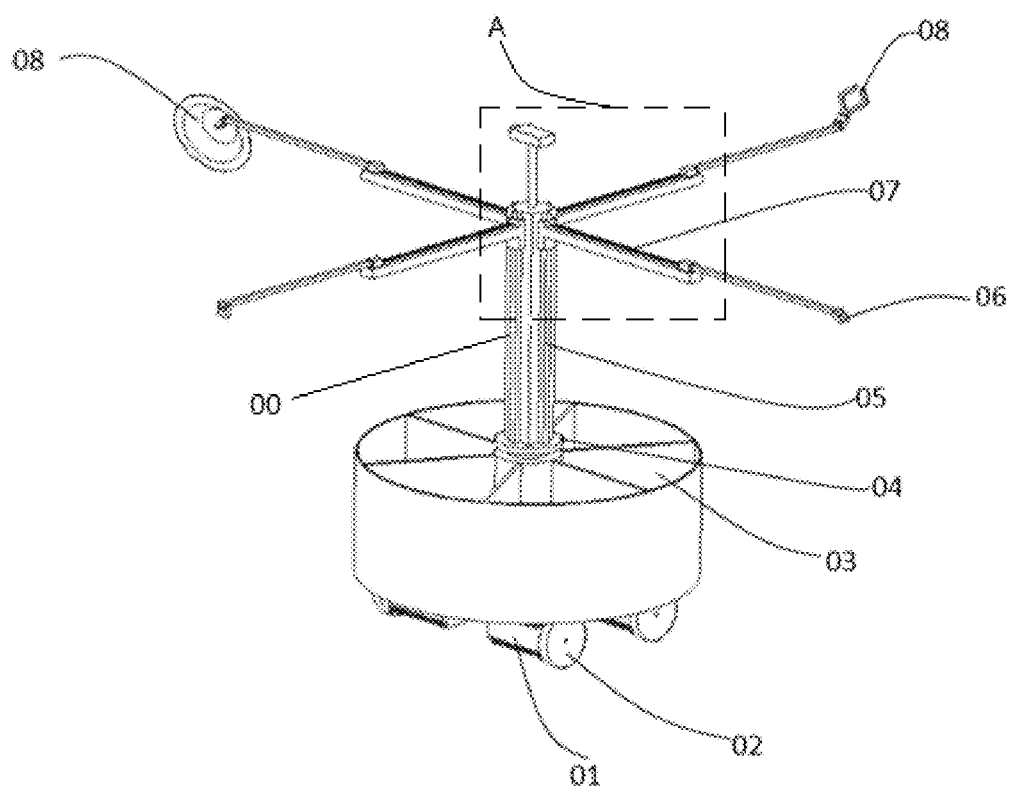
FIG. 1 is a schematic structural diagram of a smart grabbing device according to an exemplary embodiment of the present disclosure.
Figure 3:
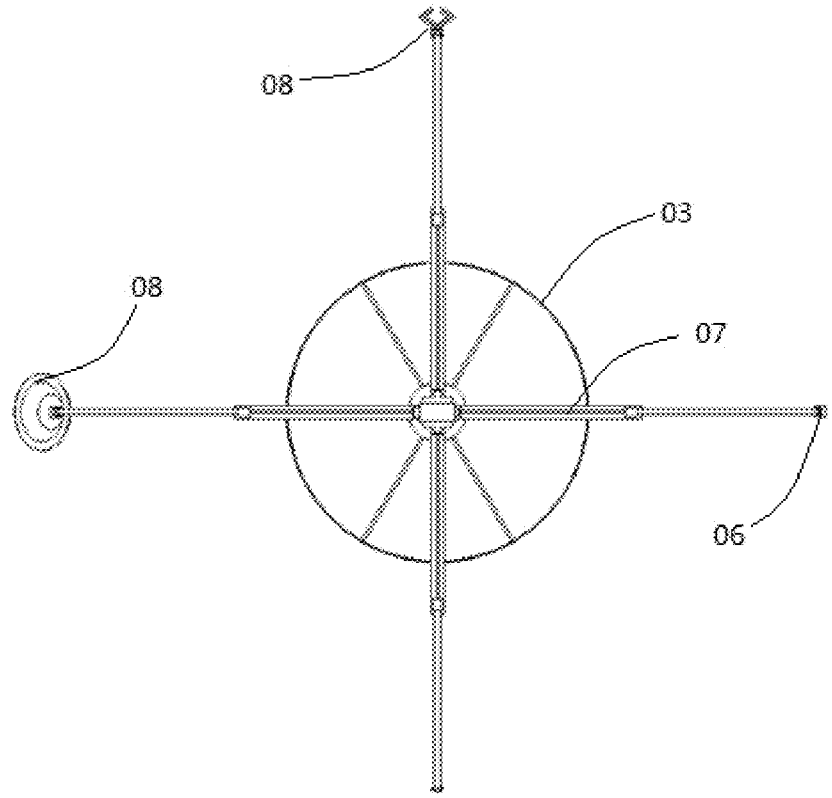
FIG. 3 is a top view of the smart gripping device shown in FIG. 1.

FIG. 1 and FIG. 3 are referred.

One embodiment of the present disclosure provides a smart grabbing device including: a controller, a container 03 for accommodating articles, a grabber 00 for grabbing articles, and a movable mover 02. The mover 02 is located at a bottom of the container 03. The grabber 00 is disposed on the container 03. Both of the grabber 00 and the mover 02 are electrically coupled with the controller.

The controller is configured to, control the mover 02 to drive the smart grabbing device to move to a target position, and control the grabber 00 to grab a target article and place the target article in the container 03.

The smart grabbing device of one embodiment of the present disclosure is coupled with a cloud end in a communication mode. The smart grabbing device may be coupled with a user terminal through the cloud end, or the smart grabbing device may be directly coupled with the user terminal. Specifically, when the smart grabbing device is used as a shopping cart, a user logs in through an APP at home, and remotely accesses the cloud end. The cloud end is in communication with one shopping cart, and then the user can remotely control the shopping cart. Of course, the user may also communicate with the user terminal by scanning a two-dimensional code on site. After the user selects an article needed to be purchased on the APP, an execution instruction is sent to the smart grabbing device through the APP. According to the execution instruction, the smart grabbing device grabs the article in the shopping area. In the process that the smart grabbing device grabs the article, the user may do other things and does not have to be in a shopping supermarket or a shopping mall for shopping. After the smart grabbing device finishes purchasing, the smart grabbing device may be transported by delivery staff to a position designated by the user, which is convenient for users to optimize their own time arrangement.

When the smart grabbing device is used for shopping, the container 03 is used for accommodating articles, and is equivalent to a basket of the shopping cart. The container 03 is mainly used for accommodating goods grabbed by the smart grabbing device. The grabber 00 is mainly used for grabbing the goods specified by the user from a goods shelf and placing the goods into the container 03. The mover 02 is mainly used for moving the whole smart grabbing device to a specified target position, such as a target position where the goods are located, and a delivery area of delivery goods. The controller is electrically coupled with the forgoing mover 02 and the grabber 00, so that when the controller receives the execution instruction, the controller can control the mover 102 to drive the smart grabbing device to move to the target position, and control the grabber 00 grabs the target article and place the target article into the container 03. Further, the smart grabbing device is provided with a motor 01, and the mover 02 is a driving wheel. The motor 01 is electrically coupled with the controller; the driving wheel is connected with the motor 01. The controller controls the motor 01 to drive the driving wheel to rotate so as to drive the whole smart grabbing device to move.

Further, the grabber 00 includes at least one telescopic assembly 07. The telescopic assembly 07 includes an end arranged on the container 03 and another end provided with a grabbing assembly 08. The another end of the telescopic assembly 07, which is provided with the grabbing assembly 08, is extended and retracted with the end of the telescopic assembly 07, which is arranged on the container 03, being taken as a fulcrum. In order to facilitate smooth movement of the smart grabber 00 in the shopping area, convenient storage of the smart grabber 00 when the smart grabber 00 is not used and reduce space occupied by the grabber 00, the grabber 00 includes at least one telescopic assembly 07. Further, in order to reduce the space occupied by the grabber 00 and enable the grabber 00 to place the grabbed articles into the container 03, one end of the telescopic assembly 07 is arranged on the container 03, and the other end of the telescopic assembly 07 is provided with the grabbing assembly 08. When the grabbing assembly 08 grabs a target article or does not grab articles, the telescopic assembly 07 is retracted to reduce the space occupied by the telescopic assembly 07, thereby preventing the smart grabbing device from touching or colliding with other article in the process of movement and preventing other articles from blocking the movement of the smart grabbing device. When the grabbing assembly 08 grabs the article, the telescopic assembly 07 is retracted to place the grabbed article into the container 03. Since one end of the telescopic assembly 07 is arranged on the container 03 and the other end of the telescopic assembly 07 is provided with the grabbing assembly 08, the one end of the telescopic assembly 07, which is arranged on the container 03, may be taken as a telescopic fulcrum, so that the other end of the telescopic assembly 07 can move away from the one end to enable the telescopic assembly 07 to be extended, or the other end of the telescopic assembly 07 can move close to the one end to enable the telescopic assembly 07 to be retracted. Further, the grabbing assembly 08 is disposed on the other end of the telescopic assembly 07, so that the grabbing assembly 08 can conveniently grab articles. The grabbing assembly 08 may be a component that can firmly grabs the target article, such as a gripper or a sucker. A distal end of one telescopic assembly 07 is provided with only one type of grabbing assembly 08.

Further, the grabber 00 further includes a rotating assembly 04. The telescopic assembly 07 is connected with the container 03 through the rotating assembly 04. Since the distal end of one telescopic assembly 07 is provided with only one type of grabbing assembly 08, when the grabber 00 includes the rotating assembly 04, the other end of the telescopic assembly 07 distal to the grabbing assembly 08 is connected with the rotating assembly 04 and then is connected with the container 03 through the rotating assembly 04. When target articles are varied, different grabbing assemblies 08 may be used. When it is needed to use a different grabbing assembly 08 to grab an article, the rotating assembly 04 is rotated until one grabbing assembly 08 capable of grabbing the article is rotated to an orientation where the article is located, so that the one grabbing assembly 08 can grabs the article. In combination with the foregoing motor 01 arranged on the smart grabbing device, the controller can control the motor 01 to drive the rotating assembly 04 to rotate.

Further, the grabber 00 further includes a lifting assembly 05. A bottom end of the lifting assembly 05 is connected with the rotating assembly 04. The other end of the telescopic assembly 07 distal to the grabbing assembly 08 is disposed on the lifting assembly 05. Further, the grabbing assembly 08 is connected with the telescopic assembly 07 through an orientation adjustment assembly 06. The orientation adjustment assembly 06 is used to adjust orientation of the grabbing assembly 08, so that the grabbing assembly 08 can easily grab the article. Further, the lifting assembly 05 can adjust a height of the telescopic assembly 07, and thus the height of the telescopic assembly 07 can be adjusted according to a height of a to-be-grabbed article, so that the corresponding article can be conveniently grabbed. Meanwhile, the lifting assembly 05 is connected with the rotating assembly 04, so that when the rotating assembly 04 is rotated, the rotating assembly 04 drives the lifting assembly 05 to rotate and then drive the telescoping assembly 07 to rotate. In this way, when the height of the telescoping assembly 07 is adjusted to be able to grab the article, the direction of the telescoping assembly 07 is adjusted simultaneously, so that the grabbing assembly 08 capable of grabbing the article can be adjusted to the direction of the article.

Optionally, the end of the telescopic assembly 07 distal to the grabbing assembly 08 may be in a fixed connection or a slidable connection with the lifting assembly 05. When the end of the telescopic assembly 07 distal to the grabbing assembly 08 is in a fixed connection with the lifting assembly 05, the lifting assembly 05 may be a telescopic mechanical arm, and the end of the telescopic assembly 07 distal to the grabbing assembly 08 may be fixed to a distal end of a top portion of the mechanical arm.

Figure 2:
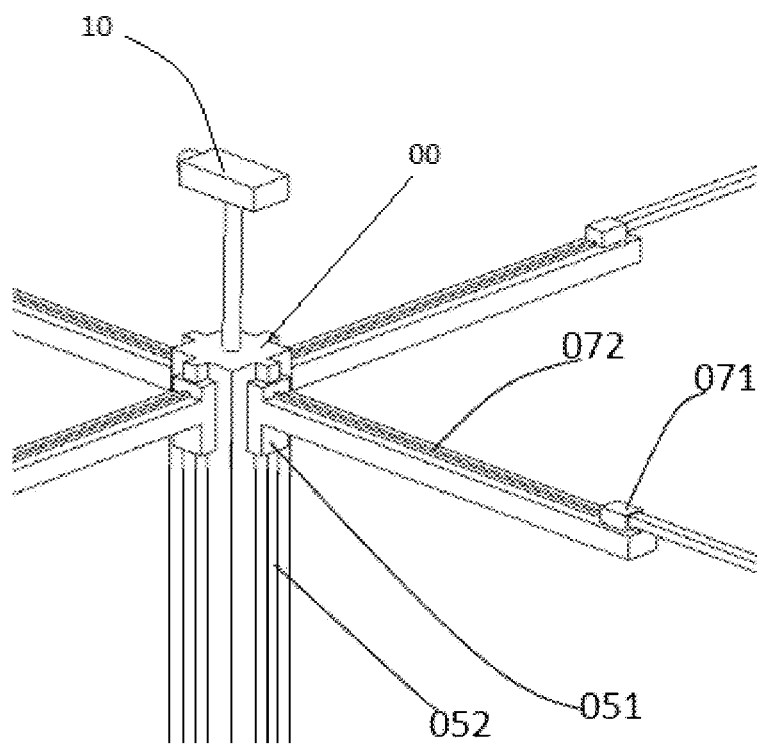
FIG. 2 is a schematic enlarged view of part A shown in FIG. 1.

Referring to FIG. 2, FIG. 2 is an enlarged view of part A shown in FIG. 1

Optionally, when the end of the telescopic assembly distal to the grabbing assembly is in a slidable connection with the lifting assembly 05, a first slide rail 052 is provided on the lifting assembly 05 and extends along an axial direction of the lifting assembly 05. A first slide block 051 is disposed on the end of the telescopic assembly distal to the grabbing assembly and is slidable along the first slide rail 052. When adjusting the height of the grabbing assembly, the controller controls the telescopic assembly to move along the lifting assembly 05 to a target height, so that the grabbing assembly on the distal end of the telescopic assembly can easily grab the article. When the telescopic assembly moves to the target height, in order to prevent the telescopic assembly from sliding downward along the lifting assembly 05, a braking assembly is provided with the first slide block 051. The braking assembly can firmly fix the first slide block 051 to the target height, thereby preventing the first slide block 051 from sliding downward. In some embodiments, the braking assembly may employ a friction brake, etc.

Further, the telescopic assembly includes at least two telescopic arms. One of two adjacent telescopic arms is provided with a second slide rail 072, and the other one of the two adjacent telescopic arms is provided with a second slide block 071. When grabbing an article, the controller controls one of two adjacent telescopic arms to slide along the other one of the two adjacent telescopic arms, thereby enabling the grabbing assembly 08 to move away from the entire device towards the article and grab the article. When the grabbing assembly 08 grabs the article, similarly, the controller controls one of two adjacent telescopic arms to slide along the other one of the two adjacent telescopic arms, until the grabbing assembly 08 places the grabbed article into the container 03. Specifically, when the smart grabbing device is not used, the process of retracting the telescopic arm is the same and will not be elaborated herein.

Further, also in combination with the foregoing motor 01 arranged on the smart grabbing device, linear movements between the first slide block 051 and the first slide rail 052, and between the second slide block 071 and the second slide rail 072, are driven by a lead screw or a synchronous belt driven by the motor 01, thereby realizing relative sliding movement between the first slide block 051 and the first slide rail 052, as well as relative sliding movement between the second slide block 071 and the second slide rail 072. In this way, positions of the grabbing assembly 08 are adjusted.

Further, the container includes at least two accommodating chambers corresponding to article categories. The accommodating chambers are disposed around the grabber, so that the telescopic assembly can place one grabbed article into one accommodating chamber corresponding to the article category of the grabbed article. Specifically, there is a plurality of accommodating chambers in the container, so that articles of different categories can be easily placed in different accommodating chambers; or, when one accommodating chamber is filled with articles, a newly grabbed article can be placed in another accommodating chamber, which is empty or not filled with articles and which is corresponding to the article category of the newly grabbed article. The various accommodating chambers are disposed around the whole grabber and the rotating assembly 04 can rotate relative to the container, therefore, it is easily to place grabbed articles in corresponding accommodating chambers.

Figure 9:
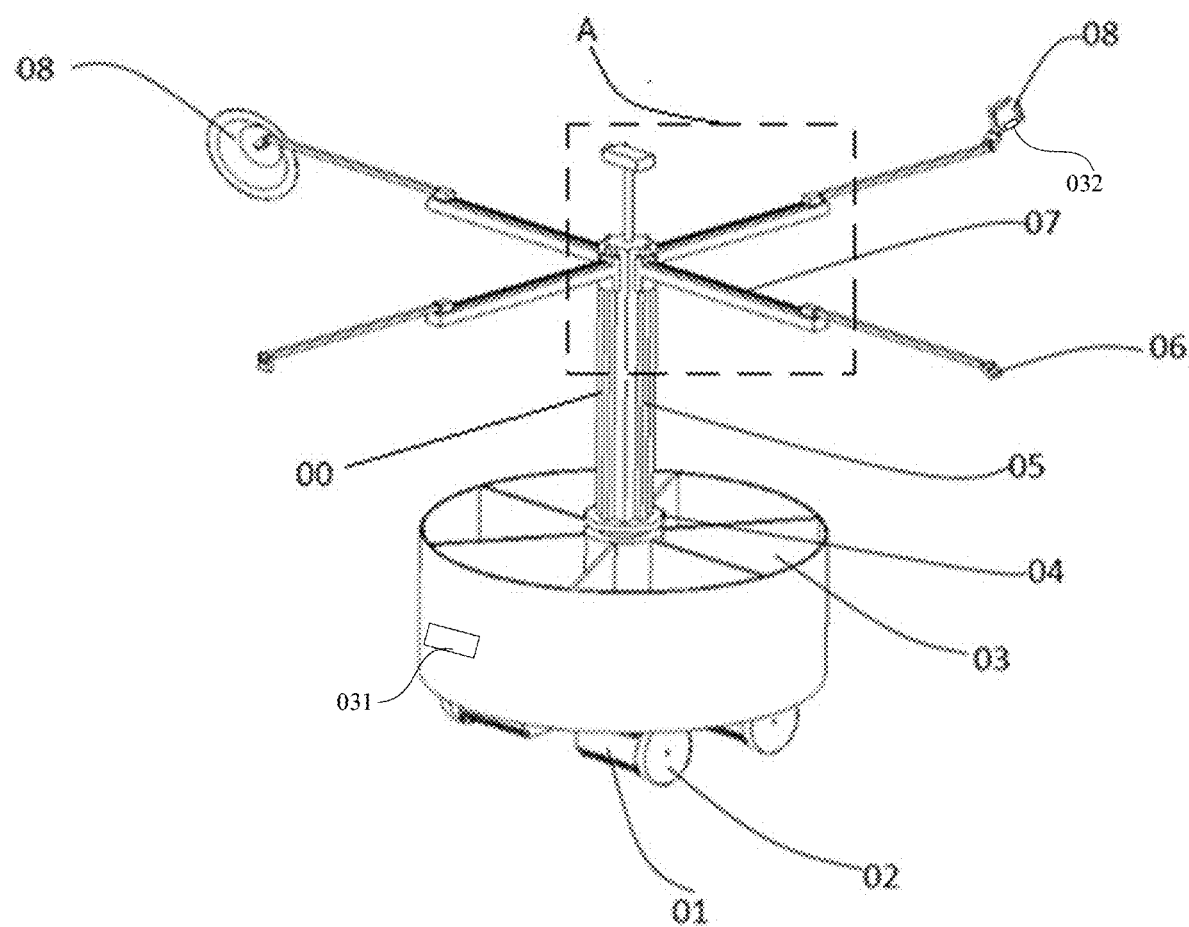
FIG. 9 is a schematic structural diagram of a smart grabbing device according to an exemplary embodiment of the present disclosure.

Further, the smart grabbing device includes a measurer 032 (as shown in FIG. 9) which is electrically coupled with the controller and is used to measure target articles. The measurer 032 is disposed at one end for grabbing articles of the grabbing assembly. Specifically, the measurer is used to measure weight of articles. The measurer may be disposed at a distal end of the telescopic assembly or at the last section of the telescopic boom, and the last section of the telescopic boom is connected with the grabbing assembly.

Further, the smart grabbing device includes a camera 10 which is electrically coupled with the controller. The camera 10 is disposed at a top of the grabber 00.

Further, the smart grabbing device includes an infrared sensor and/or an ultrasonic sensor 031 (as shown in FIG. 9) which is electrically coupled with the controller and is used to obtain obstacle information. Based on the obtained obstacle information, the smart grabbing device can avoid obstacles, thereby preventing the smart grabbing device from colliding with obstacles or preventing obstacles from blocking movement of the smart grabbing device.

Figure 4:
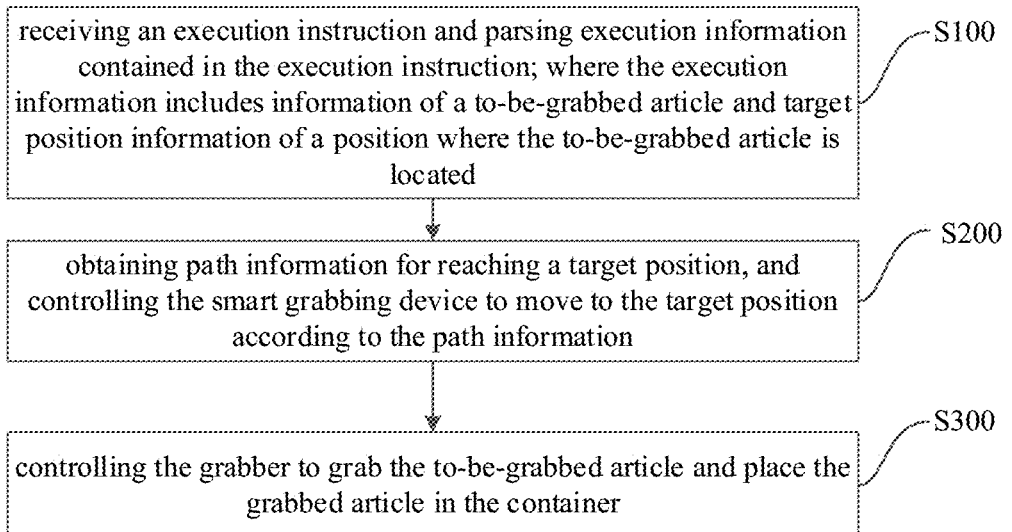
FIG. 4 is a flowchart of a method for controlling a smart grabbing device according to an exemplary embodiment of the present disclosure.

One embodiment of the present disclosure provides a method for controlling a smart grabbing device, which may be applied to the mart grabbing device of any above technical solution. As shown in FIG. 4, the method includes S100, S200 and S300.

S100: receiving an execution instruction and parsing execution information contained in the execution instruction; where the execution information includes information of a to-be-grabbed article and target position information of a position where the to-be-grabbed article is located.

S200: obtaining path information for reaching a target position, and controlling the smart grabbing device to move to the target position according to the path information.

S300: controlling the grabber to grab the to-be-grabbed article and place the grabbed article in the container.

After a user is in communication with the smart grabbing device through the APP or the user is in communication with a shopping cart, the user selects a target article to be purchase. The user may select the target article to be purchased on the APP. After the user finishes selection of the target article on the APP, once the user selects confirmation on the APP, a grabbing instruction is generated. The grabbing instruction includes grabbing information. The grabbing information mainly includes information of the target article and the target position information of the position where the target article is located. The target position information is position information of the position where the target article is located. Based on the information of the target article and the target position information, a moving path for reaching the target article is planned. When planning the moving path, the path information is generated at the same time. The controller controls the smart grabbing device to move to the target position according to the path information. The path information mainly includes coordinates, moving distances or moving directions, etc. The moving path may be automatically planned based on a preset map or by the user. After reaching the target position, the grabber is controlled to grab the target object and place it in the container, thereby completing the grabbing process of the target article.

Further, the smart grabbing device includes a measurer. The measurer is provided with a preset measurement standard. After controlling the grabber to grab the to-be-grabbed article and place the grabbed article in the container, the method further includes: according to the preset measurement standard, measuring the to-be-grabbed article to obtain an amount of money of the grabbed article.

Further, after controlling the grabber to grab the to-be-grabbed article and place the grabbed article in the container, the method further includes: summing amounts of money of all grabbed articles in the container to obtain a total amount of money of all grabbed articles in the container.

The measurement standard is unit price for measurement. After grabbing one article, when a measuring unit of the article is pack, bag or piece, the grabbed article is measured according to a quantity selected by the user, and then the total price of the grabbed articles can be obtained. When a measuring unit of the article is weight, the measurer measures the weight of the grabbed article. Based on this, amounts of money of all grabbed articles in the container are added up to obtain a total amount of money of all grabbed articles in the container, i.e., the amount of money to be paid by the user. Further, the total amount of money is obtained, settlement shall be conducted according to a settlement mode selected by the user, such as third-party payment, payment after delivery, or payment with the current balance of funds in the App. In some embodiments, the measurer may include an electronic scale such as a weighing sensor and a counter.

Figure 5:
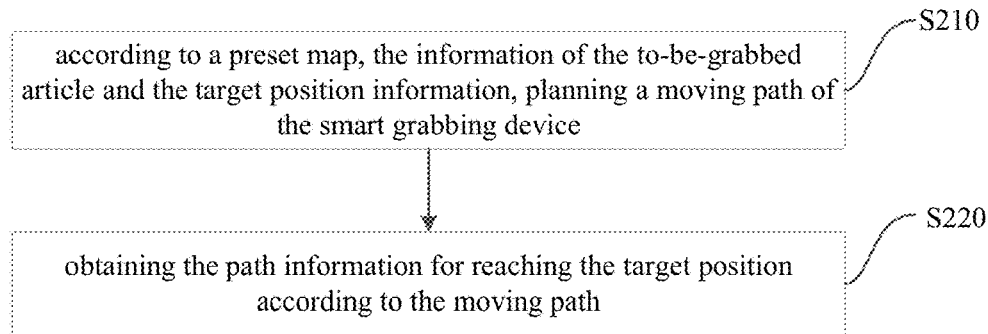
FIG. 5 is a flowchart of an example of a method for controlling a smart grabbing device according to some embodiments of the present disclosure.

Further, in one embodiment as shown in FIG. 5, the step of obtaining path information for reaching a target position, includes S210 and S220.

S210: according to a preset map, the information of the to-be-grabbed article and the target position information, planning a moving path of the smart grabbing device.

S220: obtaining the path information for reaching the target position according to the moving path.

A map of a current shopping area is pre-configured in the APP. The shopping area may be a supermarket or a shopping mall. After the user finishes selection of the target article and obtains the target position information corresponding to the target article, the moving path of the smart grabbing device is planned through the preset map and the target position information. When planning the moving path, a straight path with few obstacles is selected as much as possible. If there are several target positions, when planning the moving path, repeated trips to the target articles in one type of product area are as few as possible, i.e., completely grabbing all target articles in one type of product area, and then moving to the next target position where target articles are located. Meanwhile, when two types of target articles are located in adjacent two types of product area, after all target articles in one of the adjacent two types of product area are grabbed, the next target position for movement is the other one of the adjacent two types of product area. In this way, it can save time on purchasing articles and shorten path of movement. Same as described above, when planning the moving path, the path information is generated at the same time, which is not elaborated herein.

Figure 6:
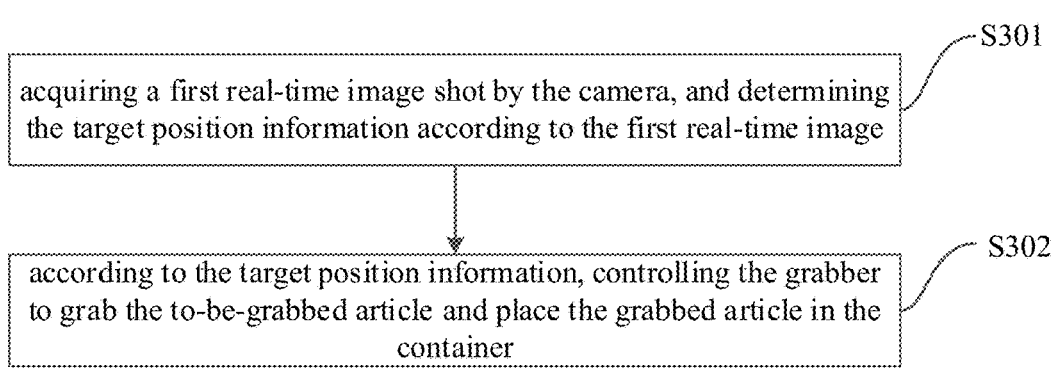
FIG. 6 is a flowchart of another example of a method for controlling a smart grabbing device according to some embodiments of the present disclosure.

Further, in one embodiment, as shown in FIG. 6, the smart grabbing device further includes a camera. The step of controlling the grabber to grab the to-be-grabbed article and place the grabbed article in the container, specifically includes S301 and S302.

S301: acquiring a first real-time image shot by the camera, and determining the target position information according to the first real-time image;

S302, according to the target position information, controlling the grabber to grab the to-be-grabbed article and place the grabbed article in the container.

When the mart grabbing device is provided with the camera, after the mart grabbing device reaches the target position, it is required to determine specific orientation and height of the target article. After the camera shoots the first real-time image, the orientation and height (i.e., the target position information) of the target article can be determined according to the first real-time image, and then the grabber is controlled to adjust its own orientation and height so as to grab the target article and place the target article in the container.

Figure 7:
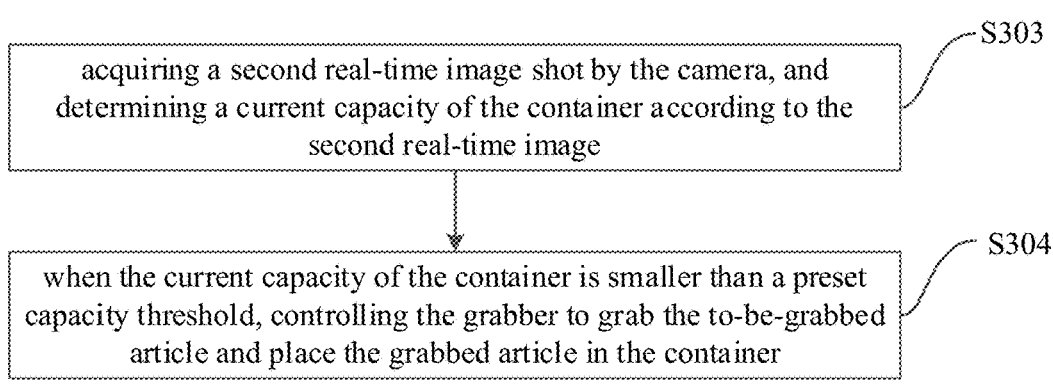
FIG. 7 is a flowchart of yet another example of a method for controlling a smart grabbing device according to some embodiments of the present disclosure.

Further, in one embodiment, as shown in FIG. 7, the step of controlling the grabber to grab the to-be-grabbed article and place the grabbed article in the container, further includes S303 and S304.

S303: acquiring a second real-time image shot by the camera, and determining a current capacity of the container according to the second real-time image;

S304, when the current capacity of the container is smaller than a preset capacity threshold, controlling the grabber to grab the to-be-grabbed article and place the grabbed article in the container.

The container includes a plurality of accommodating chambers. After completion of grabbing the target article, the capacity of the container is determined according to the second real-time image shot by the camera. In other words, the camera shoots an image (i.e., the second real-time image) of the container, and the current capacity of each accommodating chamber of the container is determined by processing the image, and then which accommodating chamber can still accommodate articles is determined. The specific determining process includes:

after determining a capacity of each accommodating chamber, comparing the capacities of the accommodating chambers with the preset capacity threshold of the accommodating chambers; when the current capacities of the accommodating chambers (container) is smaller than the preset capacity threshold, controlling the grabber to grab the to-be-grabbed article and place the grabbed article in the container.

Further, before the step of obtaining the path information for reaching the target position, the method includes: receiving a movement instruction of a user and parsing movement information included in the movement instruction. The movement information includes the path information for reaching the target position.

When the user manually controls the smart grabbing device, the APP receives the movement instruction of the user. The movement instruction includes the movement information. The movement information includes the path information for reaching the target position. After the movement information is parsed, it is convenient to control the smart grabbing device to move towards a movement direction set by the user. The specific movement information is the same as that of the foregoing description and is not elaborated herein.

Figure 8:
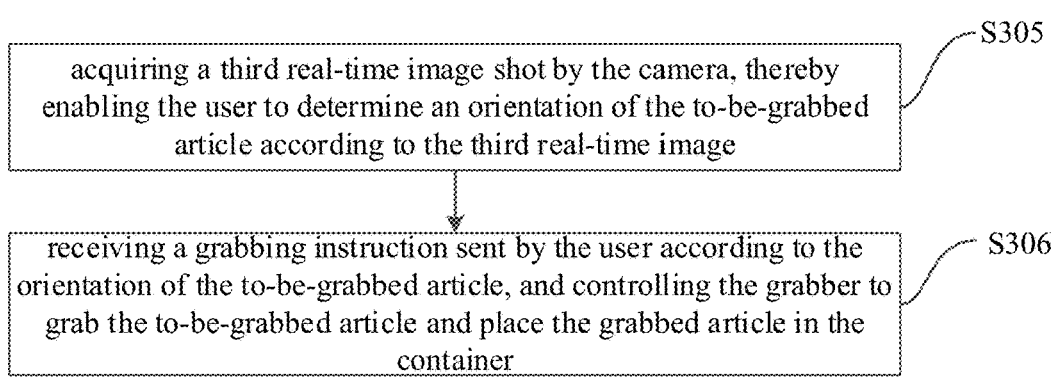
FIG. 8 is a flowchart of still another example of a method for controlling a smart grabbing device according to some embodiments of the present disclosure.

Further, in one embodiment, as shown in FIG. 8, the smart grabbing device includes a camera. The step of controlling the grabber to grab the to-be-grabbed article and place the grabbed article in the container, further includes S305 and S306.

S305: acquiring a third real-time image shot by the camera, thereby enabling the user to determine an orientation of the to-be-grabbed article according to the third real-time image;

S306: receiving a grabbing instruction sent by the user according to the orientation of the to-be-grabbed article, and controlling the grabber to grab the to-be-grabbed article and place the grabbed article in the container.

Further, when the user controls the smart grabbing device to reach an area where the target article is located, the camera shoots the third real-time image. The user determines the orientation (i.e., the target position information) of the target article according to the third real-time image shot by the camera. When the user determines the target position information, the user sends the grabbing instruction via the APP to the smart grabbing device. The grabbing instruction also includes the target position information and information of target article. Then, the grabber is controlled to grab the to-be-grabbed article and place the grabbed article in the container.

One embodiment of the present disclosure provides a computer readable storage medium, which stores a computer program thereon. When the computer program is executed, steps of the method for controlling the smart grabbing device of any of the above embodiments are implemented.

One embodiment of the present disclosure provides a terminal for the smart grabbing device. The terminal includes a processor and a memory. The memory stores a computer program thereon. When the computer program is executed, steps of the method for controlling the smart grabbing device of any of the above embodiments are implemented.

One embodiment of the present disclosure provides a grabbing control system including a client and a computer readable storage medium or a terminal for the smart grabbing device. The client is configured to perform information interaction with the computer readable storage medium or the terminal for the smart grabbing device, thereby implementing the method for controlling the smart grabbing device of any of the above embodiments are implemented. The client, such as the foregoing APP, facilitates information interaction between the user and the terminal for the smart grabbing device. In addition, the target object, the target article, the to-be-grabbed article and the grabbed article are commodities in the shopping area in the embodiment of the present disclosure.

In addition, various functional units in the embodiments of the present disclosure may be integrated in one processing module, or the various units may physically exist separately, or two or more units may be integrated in one module. The integrated module may be implemented in the form of hardware, and also may be implemented in the form of a software functional module. When the integrated module is implemented in the form of the software functional module and sold or used as an independent product, such software functional module may be stored in a computer readable storage medium.

The storage medium mentioned above may be a read-only memory, a magnetic disk or an optical disk and the like.

The above are merely the preferred embodiments of the present disclosure. It should be noted that, a person skilled in the art may make improvements and modifications without departing from the principle of the present disclosure, and these improvements and modifications shall also fall within the scope of the present disclosure.

What is claimed is:

1. A smart grabbing device comprising: a controller, a container configured to accommodate articles, a grabber configured to grab the articles, and a movable mover;
   wherein the mover is at a bottom of the container; the grabber is on the container; and both of the grabber and the mover are electrically coupled with the controller;
   the controller is configured to, control the mover to drive the smart grabbing device to move to a target position, and control the grabber to grab a target article and place the target article in the container;
   wherein the grabber includes a rotating assembly, a lifting assembly and multiple sets of telescopic assemblies;
   the rotating assembly is disposed on the container;
   the lifting assembly includes a columnar portion which is substantially perpendicularly arranged on the rotating assembly, and multiple first slide rails arranged at intervals on an outer peripheral surface of the columnar portion;
   the multiple sets of telescopic assemblies are corresponding to the multiple first slide rails in a one-to-one manner;
   each of the multiple sets of telescopic assemblies includes a first slide block, a first arm, a second arm, a second slide rail and a second slide block;
   the first slide block is in a slidable engagement with the corresponding first slide rail;
   an end of the first arm is disposed on the first slide block;
   the second slide block is in a slidable engagement with the second slide rail; the second slide block is disposed on one of the first arm and the second arm, and the second slide rail is disposed on the other one of the first arm and the second arm.

2. The smart grabbing device according to claim 1, wherein the container includes at least two accommodating chambers corresponding to article categories; and the accommodating chambers are disposed around the grabber.

3. The smart grabbing device according to claim 1, further comprising: a measurer which is electrically coupled with the controller and is configured to measure target articles; wherein the measurer is disposed at one end of the second arm.

4. The smart grabbing device according to claim 1, further comprising: a camera which is electrically coupled with the controller; wherein the camera is disposed at a top of the columnar portion.

5. The smart grabbing device according to claim 1, further comprising: at least one of an infrared sensor or an ultrasonic sensor electrically coupled with the controller and configured to obtain obstacle information.

6. A method for controlling a smart grabbing device, which is applied to the smart grabbing device of claim 1, the method comprising:
   receiving an execution instruction and parsing execution information contained in the execution instruction; wherein the execution information includes information of a to-be-grabbed article and target position information of a position where the to-be-grabbed article is located;
   obtaining path information for reaching a target position, and controlling the smart grabbing device to move to the target position according to the path information; and
   controlling the grabber to grab the to-be-grabbed article and place the grabbed article in the container.

7. The method according to claim 6, wherein the smart grabbing device includes a measurer; the measurer is provided with a preset measurement standard; after controlling the grabber to grab the to-be-grabbed article and place the grabbed article in the container, the method further includes: according to the preset measurement standard, measuring the grabbed article to obtain an amount of money of the grabbed article.

8. The method according to claim 7, wherein after controlling the grabber to grab the to-be-grabbed article and place the grabbed article in the container, the method further includes: summing amounts of money of all grabbed articles in the container to obtain a total amount of money of all grabbed articles in the container.

9. The method according to claim 8, wherein obtaining path information for reaching a target position, includes:
   according to a preset map, the information of the to-be-grabbed article and the target position information, planning a moving path of the smart grabbing device; and
   obtaining the path information for reaching the target position according to the moving path.

10. The method according to claim 9, wherein the smart grabbing device includes a camera; controlling the grabber to grab the to-be-grabbed article and place the grabbed article in the container, includes:
    acquiring a first real-time image shot by the camera, and determining the target position information according to the first real-time image; and
    according to the target position information, controlling the grabber to grab the to-be-grabbed article and place the grabbed article in the container.

11. The method according to claim 10, wherein controlling the grabber to grab the to-be-grabbed article and place the grabbed article in the container, further includes:

acquiring a second real-time image shot by the camera, and determining a current capacity of the container according to the second real-time image;

when the current capacity of the container is smaller than a preset capacity threshold, controlling the grabber to grab the to-be-grabbed article and place the grabbed article in the container.

12. The method according to claim 8, wherein before obtaining path information for reaching a target position, the method includes: receiving a movement instruction of a user and parsing movement information included in the movement instruction; wherein the movement information includes the path information for reaching the target position.

13. The method according to claim 12, wherein the smart grabbing device includes a camera; controlling the grabber to grab the to-be-grabbed article and place the grabbed article in the container, includes:

acquiring a real-time image shot by the camera, thereby enabling the user to determine an orientation of the to-be-grabbed article according to the real-time image; and receiving a grabbing instruction sent by the user according to the orientation of the to-be-grabbed article, and controlling the grabber to grab the to-be-grabbed article and place the grabbed article in the container.

14. A grabbing control system, comprising:

a user terminal; and the smart grabbing device according to claim 1;

wherein the user terminal is in communication with the smart grabbing device; and the smart grabbing device receives an execution instruction sent by the user terminal and performs:

parsing execution information contained in the execution instruction; wherein the execution information includes information of a to-be-grabbed article and target position information of a position where the to-be-grabbed article is located;

obtaining path information for reaching a target position, and controlling the smart grabbing device to move to the target position according to the path information; and controlling the grabbing grabber to grab the to-be-grabbed article and place the grabbed article in the container.

15. The smart grabbing device according to claim 1, wherein each of the multiple first slide rails extends along an axial direction of the columnar portion, and is substantially perpendicular to the rotating assembly.

16. The smart grabbing device according to claim 1, wherein the grabber further includes a grabbing assembly disposed at the second arm of each of the multiple sets of telescopic assemblies; and the grabbing assemblies of the multiple sets of telescopic assemblies at least include a gripper and a sucker.

17. The smart grabbing device according to claim 16, wherein the grabber further includes an orientation adjustment assembly disposed at the second arm of each of the multiple sets of telescopic assemblies; the grabbing assembly is disposed at the second arm of each of the multiple sets of telescopic assemblies through the orientation adjustment assembly.

18. The smart grabbing device according to claim 1, wherein the grabber further includes a braking assembly disposed between the first slide block and the columnar portion.

19. The smart grabbing device according to claim 18, wherein the braking assembly is a friction brake.

20. The smart grabbing device according to claim 15, wherein the first arm and the second arm are substantially perpendicular to the axial direction of the columnar portion.

* * * * *